(12) United States Patent
Sharvit et al.

(10) Patent No.: US 11,671,465 B2
(45) Date of Patent: Jun. 6, 2023

(54) DISTRIBUTED CONSISTENCY GROUP AT SPLITTER

(71) Applicant: EMC IP Holding Company LLC, Hopkinton, MA (US)

(72) Inventors: Erez Sharvit, Ramat Gan (IL); Jehuda Shemer, Kfar Saba (IL); Valerie Lotosh, Ramat Gan (IL); Saar Cohen, Moshav Mishmeret (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 268 days.

(21) Appl. No.: 16/910,482

(22) Filed: Jun. 24, 2020

(65) Prior Publication Data
US 2021/0409455 A1   Dec. 30, 2021

(51) Int. Cl.
*H04L 29/06* (2006.01)
*H04L 29/08* (2006.01)
*G06F 21/62* (2013.01)
*H04L 9/40* (2022.01)
*H04L 67/10* (2022.01)
*G06F 9/455* (2018.01)

(52) U.S. Cl.
CPC .......... *H04L 63/30* (2013.01); *G06F 9/45558* (2013.01); *G06F 21/6218* (2013.01); *H04L 67/10* (2013.01); *G06F 2009/45579* (2013.01); *G06F 2009/45587* (2013.01); *G06F 2009/45595* (2013.01)

(58) Field of Classification Search
CPC ......... H04L 63/30; H04L 63/20; H04L 63/18; H04L 63/16; H04L 67/10; H04L 67/08; H04L 67/06; H04L 67/04; H04L 67/02; H04L 67/01; H04L 67/00; G06F 9/45558; G06F 21/6218; G06F 2009/45579; G06F 2009/45587
See application file for complete search history.

(56) References Cited

U.S. PATENT DOCUMENTS

| | | | |
|---|---|---|---|
| 8,478,955 B1 * | 7/2013 | Natanzon | G06F 11/2074 707/648 |
| 10,037,251 B1 * | 7/2018 | Bono | G06F 11/2097 |
| 11,023,488 B1 * | 6/2021 | Bono | G06F 16/1824 |
| 2017/0031769 A1 * | 2/2017 | Zheng | G06F 3/0683 |
| 2018/0276085 A1 * | 9/2018 | Mitkar | G06F 3/0619 |
| 2021/0133316 A1 * | 5/2021 | Vajravel | G06F 21/53 |
| 2021/0409455 A1 * | 12/2021 | Sharvit | H04L 63/30 |

* cited by examiner

*Primary Examiner* — Phong La
(74) *Attorney, Agent, or Firm* — Workman Nydegger

(57) ABSTRACT

One example method includes intercepting an IO that is directed to a volume, writing the IO to a grid-CG that is one of a plurality of grid-CGs that collectively form a distributed CG, adding the IO to a stream journal associated with the grid-CG, receiving a bookmark request, in response to the bookmark request, inserting a bookmark in the stream journal, incrementing a splitter counter and broadcasting a splitter counter value to the grid-CGs in the distributed CG, and inserting the bookmark in respective stream journals of the grid-CGs in the distributed CG.

18 Claims, 9 Drawing Sheets

DISTRIBUTED CONSISTENCY GROUP AT SPLITTER

FIELD OF THE INVENTION

Embodiments of the present invention generally relate to the handling of IOs issued by one or more virtual machines. More particularly, at least some embodiments of the invention relate to systems, hardware, software, computer-readable media, and methods for the use of one or more splitters to write IOs to a distributed consistency group in order to reduce latency and improve throughput.

BACKGROUND

Virtual machines (VM) may be protected with the use of a data protection appliance (DPA). In general, Input/Outputs (IOs) issued by an application of a protected VM may be intercepted by a splitter which sends writes to the DPA. After receiving an acknowledgement from the DPA, the splitter forwards the writes to disk.

One problem with this approach is that interception of the IOs by the splitter introduces a delay, or latency, between the time the IO is issued by the VM, and the time the IO is actually written to disk, since the IO is not written to disk until after the splitter has received an acknowledgement from the DPA. A related problem is that such latency reduces the overall throughput of the system.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
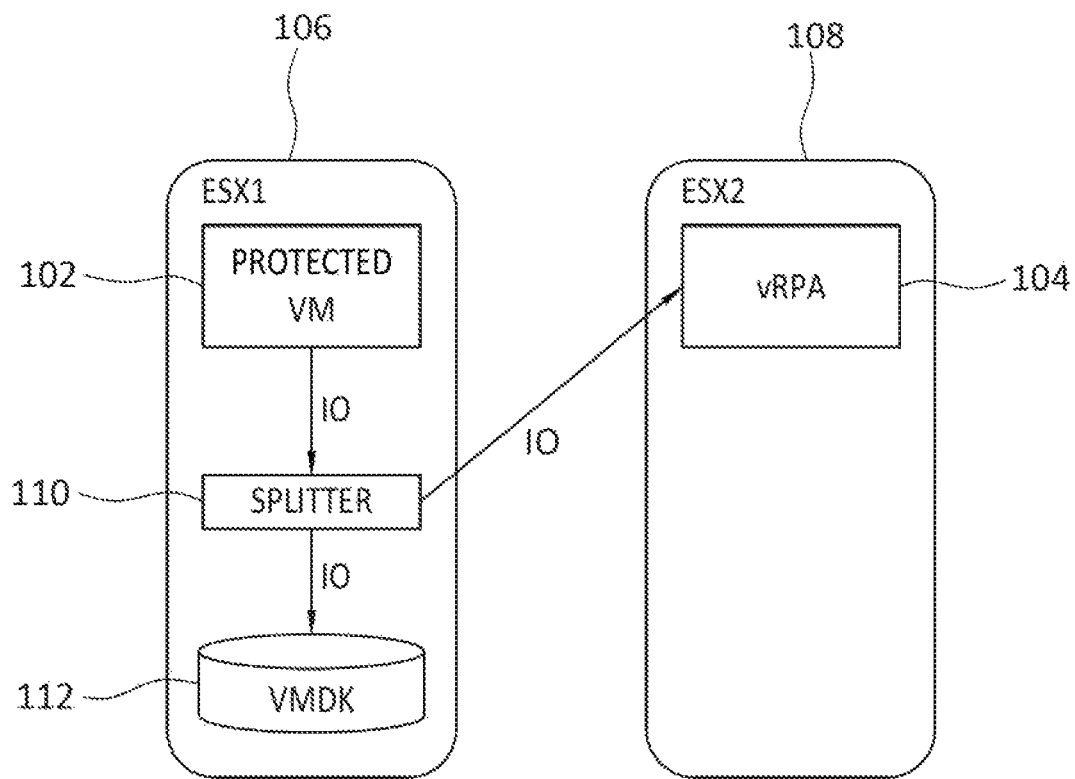
FIG. 1 discloses aspects of a VM protection configuration.

Embodiments of the present invention generally relate to data backup and restore processes. More particularly, at least some embodiments of the invention relate to systems, hardware, software, computer-readable media, and methods for reducing latency and improving throughput in a VM protection environment.

One example embodiment of the invention may employ a distributed consistency group (CG) with multiple DPAs to service IOs forwarded by one or more splitters. In this embodiment, the distribution of IOs to the DPA(s) may be performed by the splitter(s). The CG may be divided internally into several grid-CGs. Each grid-CG may be hosted by some of DPAs in a cluster, such as an RP4VM cluster, and as such, the writes of the entire CG may be distributed amongst the several DPAs. As well, the address space of each disk, such as a VMDK for example, to which the IOs are directed, will be divided to grids, and each grid may be paired with a grid-CG. The grid-CG may accept writes of the corresponding grid and store them in its own journal stream. As well, since each grid-CG may operate independently of the others, example embodiments may provide for bookmark consistency across the entire CG. In some particular embodiments of the invention, the DPA may take the form of a DellEMC virtual Recover Point Appliance (vRPA), although no particular DPA is required.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that latency between the time that an IO is issued by a VM application to the time that the IO is written to disk may be reduced. One embodiment of the invention may improve overall IO throughput from a VM to disk. An embodiment of the invention may protect a VM with high performance requirements that exceed the capability of a single DPA. An embodiment of the invention may provide bookmark consistency across a CG that comprises multiple grid-CGs. An embodiment of the invention may use one or more splitters as the IO distribution point in order to provide better performance than a DPA distribution point.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, operations concerning IOs issued by one or more protected VMs. Examples of such systems include Replication and BCDR (Business Continuity Disaster Recovery) systems. Such operations may include, but are not limited to, distribution and processing of IOs issued by one or more protected VMs data read/write/delete operations, bookmarking operations, data deduplication operations, data backup operations, data restore operations, data replication operations, data recovery operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in connection with DPAs, one example of which is the DellEMC RP4VMS (Recovery Point For Virtual Machines). In general however, the scope of the invention is not limited to any particular data replication and recovery platform.

New and/or modified data collected and/or generated in connection with some embodiments may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud environments, which may include computing environments and/or storage environments, in connection with which embodiments of the invention may be employed include, but are not limited to, Dell EMC Cloud, Microsoft Azure, Amazon AWS, and Google Cloud. More generally however, the scope of the invention is not limited to employment of any particular type or implementation of cloud environment, storage environment, or computing environment.

In addition to the storage environment, the operating environment may also include one or more clients, such as VMs for example, that are capable of collecting, modifying, and creating, data. As such, a particular client may employ, or otherwise be associated with, one or more instances of each of one or more applications that perform such operations with respect to data. In some embodiments, such applications may be container-based applications such as may be employed with the Docker and Kubernetes platforms.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs.

The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example. A VM may host one or more applications, each of which may issue IOs directed to storage, such as disk storage. Such applications may be container-based applications.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview and Comparative Examples

The following overview and comparative examples are provided as context for better illustrating various aspects of some example embodiments, and are not intended to limit the scope of the invention in any way.

With reference first to the example of FIG. 1, a consistency-group (CG) may be implemented in a protection environment such as RP4VM (DellEMC Recover Point For Virtual Machines) and may contain several protected VMs that share the same history journal and recovery logic. The CG may be hosted by a single DPA and, therefore, all protected VMs under the CG may be protected by a single DPA. As shown in FIG. 1, a protected VM 102 and DPA 104 may be hosted by respective hosts 106 and 108, such as ESXi servers for example. IOs, such as writes or deletes for example, issued by one or more applications of the protected VM 102, may be intercepted by a splitter 110. A splitter 110 may be employed that sends the IOs, such as writes, to the DPA 104 and, upon receiving an acknowledgment, or 'ACK,' from the DPA 104, the splitter 110 may then forward the writes to a disk, such as the VMDK 112. As illustrated by this comparative example, the delay that is imposed by the splitter 110 on the writing of the IO to the VMDK 112 increases the latency between the time the IO is issued by the protected VM 102 and the time the IO is written to the VMDK 112. Correspondingly, the overall throughput of the illustrated example system is reduced.

In more detail, the time that the IO is spending in the splitter 110 while waiting for DPA 104 ACK may be referred to as the "added latency." The "added latency" may be determined by the latency of the line connecting the splitter 110 with the DPA 104 and by the responsiveness of the DPA 104. A line connecting two close by ESXs may add only low latency. However, the DPA 104 responsiveness may be influenced by the DPA 104 CPU and other factors, that may make the DPA 104 less responsive as the write rate increases. For example, a single DPA with 8 CPUs may be able to accept an incoming rate of 15K IOPS (IOs per second) with added latency of 0.7 millisecond. At a rate of 30K IOPS, the latency will increase to 1.3 millisecond.

Correspondingly, the performance of the protected VM 102 may be limited by the IOPS and throughput that the DPA 104 can achieve. A DPA with 8 cores, for example, may be able to achieve 35K IOPS and 350 MB/s throughput. However, high-performance VM applications are reaching 70K IOPS, 700 MB/s throughput, and beyond. The performance of such VM applications may be significantly hampered by excessive latency.

Figure 2:
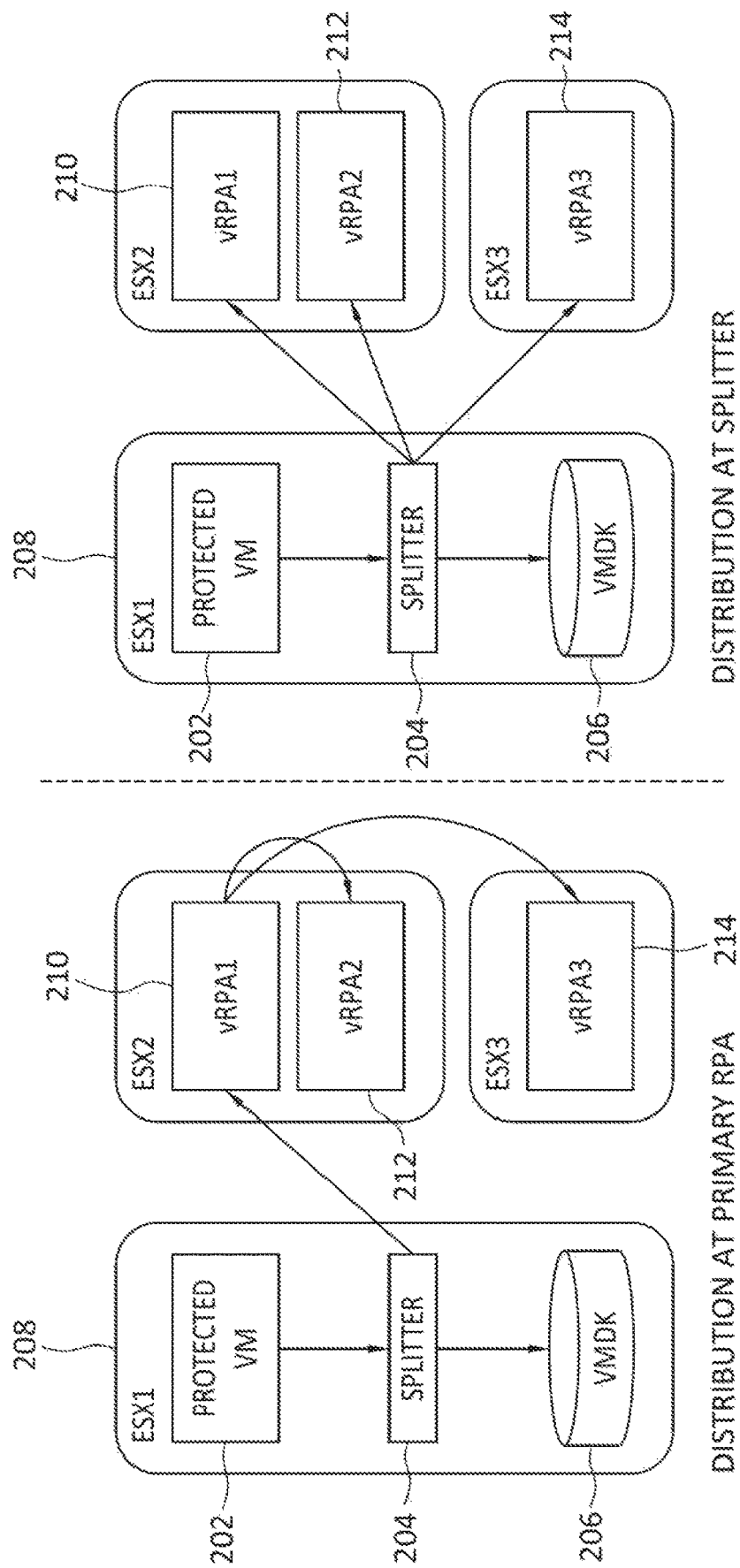
FIG. 2 discloses aspects of various IO distribution arrangements.

With the foregoing points in view, attention is directed now to FIG. 2, which includes another comparative example, and a general example of one embodiment of the invention. As shown in FIG. 2, a comparative example includes a protected VM 202, splitter 204, and VMDK 206, all hosted by a server 208. IOs issued by an application of the protected VM 202 may be intercepted by the splitter 204 and directed to a DPA-1 210 that is one of a group of DPAs that also includes DPA-2 212, and DPA-3 214. In this example configuration, all IOs from the splitter 204 are directed to the DPA-1 210, which then distributes some, or all, of the IOs amongst the DPA-2 212 and DPA-3 214. That is, the DPA-1 210, which may be referred to as the primary DPA, acts as the IO distribution point in this illustrative example.

In contrast, and as shown on the right side of FIG. 2, embodiments of the invention embrace arrangements and methods in which the splitter 204, rather than a DPA, acts as the IO distribution point. As explained elsewhere herein, this configuration may be advantageous for various reasons.

Figure 3:
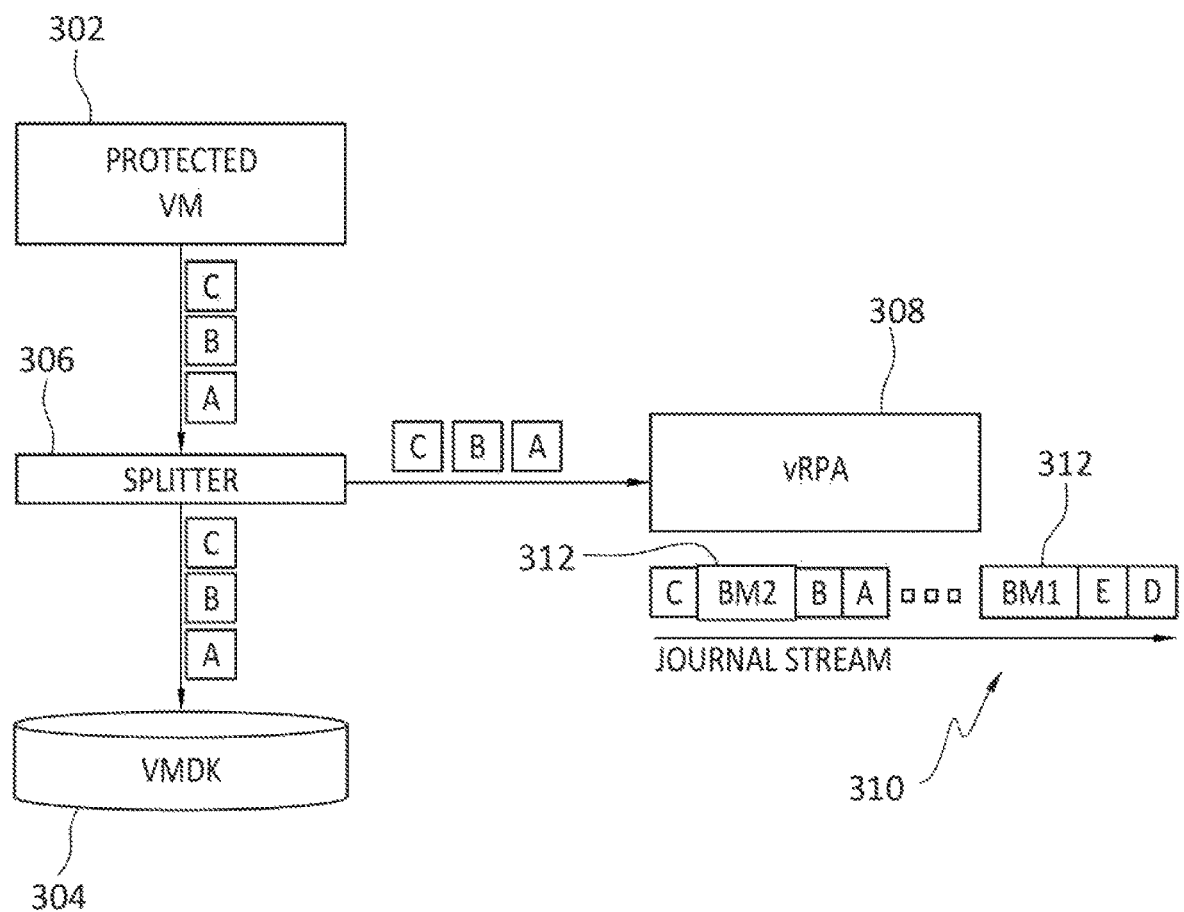
FIG. 3 discloses an arrangement in which a splitter directs IOs to a DPA that is associated with a stream journal.

With reference next to FIG. 3, a discussion is provided concerning various considerations relating to the use of a splitter as an IO distribution point. Some of these considerations concern a journal and journal stream. In the example of FIG. 3, a protected VM 302 issues IOs (A, B, and C), which are intended to be written to a disk 304. The IOs may be intercepted by a splitter 306 and distributed to a DPA 308. After receipt, by the splitter 306, of an ACK from the DPA 308, the IOs may be forwarded by the splitter 306 to the disk 304. In order to maintain consistency between the protected VM 302 and a replica VM (not shown), the DPA 308 may employ a journal stream 310 to store the writes in the order of arrival. As further indicated in FIG. 3, one or more bookmarks 312 may be inserted in the journal stream to define respective points in time (PIT), or recovery points, that a user may select to recover from. The bookmarks 312, which may be inserted between consecutive writes such as 'B' and 'C' in the example of FIG. 3, may be generated by the DPA and inserted into the journal stream 310 automatically and/or upon customer request.

Figure 4:
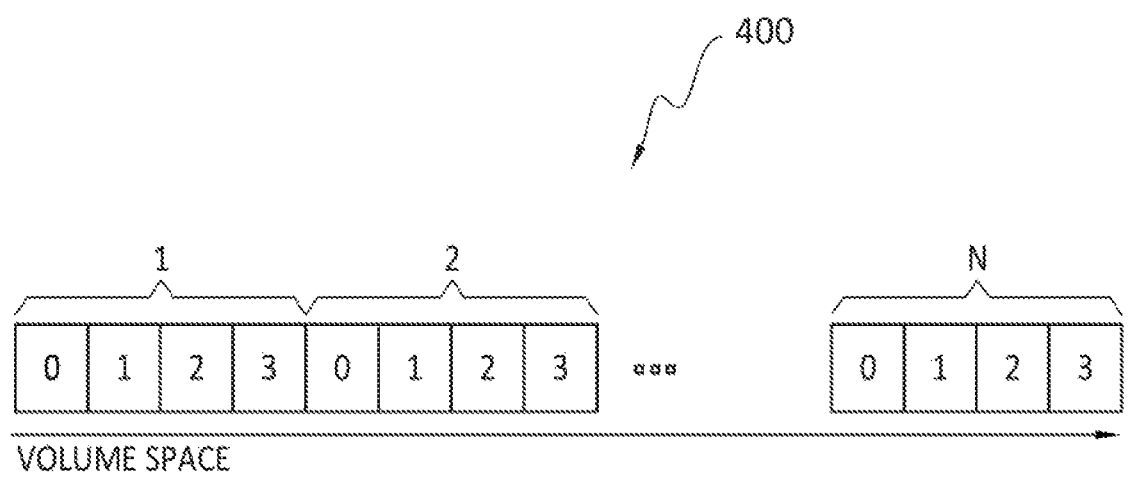
FIG. 4 discloses an example fixed grid layout associated with a storage volume.

With attention now to FIG. 4, some embodiments of the invention may employ a fixed grid layout 400. As shown there, the address space of each volume may be divided into N grids. The corresponding CG is accordingly divided into N grid-CGs, such as a grid-CG 0-1-2-3, where each grid-CG may handle its own grid independently. Thus, each DPA may host one or more grid-CGs, such that the CG is distributed among 1 to N DPAs.

As noted earlier in the discussion of the comparative examples, the added latency of a protected VM may increase almost linearly as the write rate increases. However, by distributing the writes between a number of DPAs at the splitter, as introduced above, embodiments of the invention may reduce added latency almost linearly according to the number of DPAs employed. As likewise noted earlier, the maximum achievable IOPS and throughput that a protected VM may be able to achieve is limited by the max IOPS and throughput that a single DPA can achieve. By distributing the writes among a number of DPAs, by the splitter, embodiments of the invention may increase the max IOPS and throughput linearly according to the number of DPAs employed. Thus, for example, a configuration that employs 2 DPAs rather than a single DPA, may realize, relative to the single DPA configuration, about a 2× reduction in latency, and about a 2× increase in IOPs throughput.

C. Aspects of Some Particular Example Embodiments

It was noted earlier herein that example embodiments of the invention may provide for IO distribution to be performed by a splitter, rather than by a primary DPA. In some embodiments at least, a CG may be divided internally into several grid-CGs. Each of the grid-CGs may be hosted by one of the DPAs in a protection cluster and, in this way, the writes of the entire CG may be distributed among several DPAs. As well, an address space of each volume, such as a VMDK for example, may be divided into grids as shown in FIG. 4, discussed above. Each grid may then be paired with a respective grid-CG, and each grid-CG may accept writes of the corresponding grid and store those writes in a respective journal stream for that grid-CG. Note that a grid-CG may also be referred to herein as a sub-CG in some cases.

Figure 5:
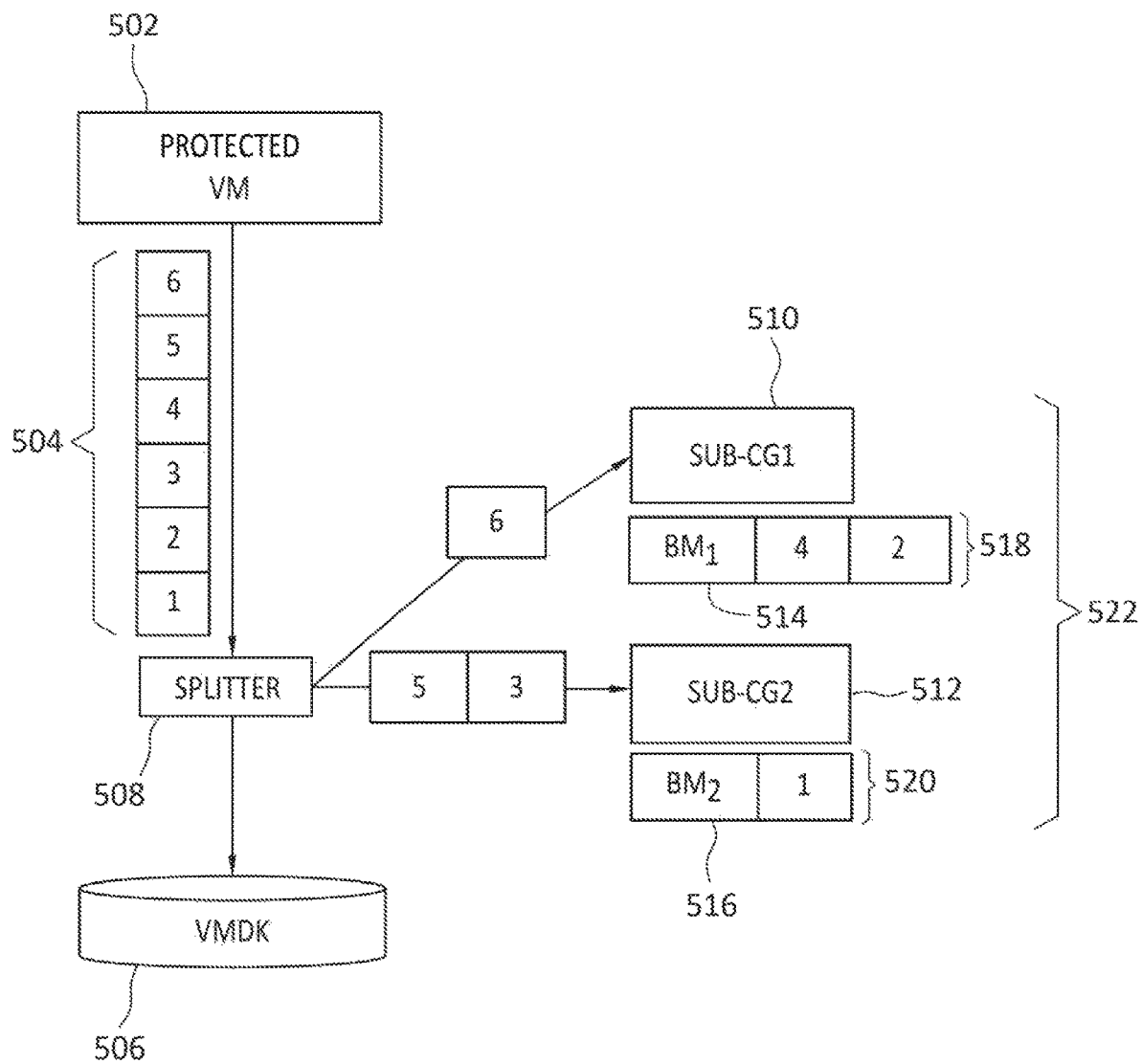
FIG. 5 discloses an example arrangement in which a splitter writes IOs to multiple grid-CGs.
Figure 6:
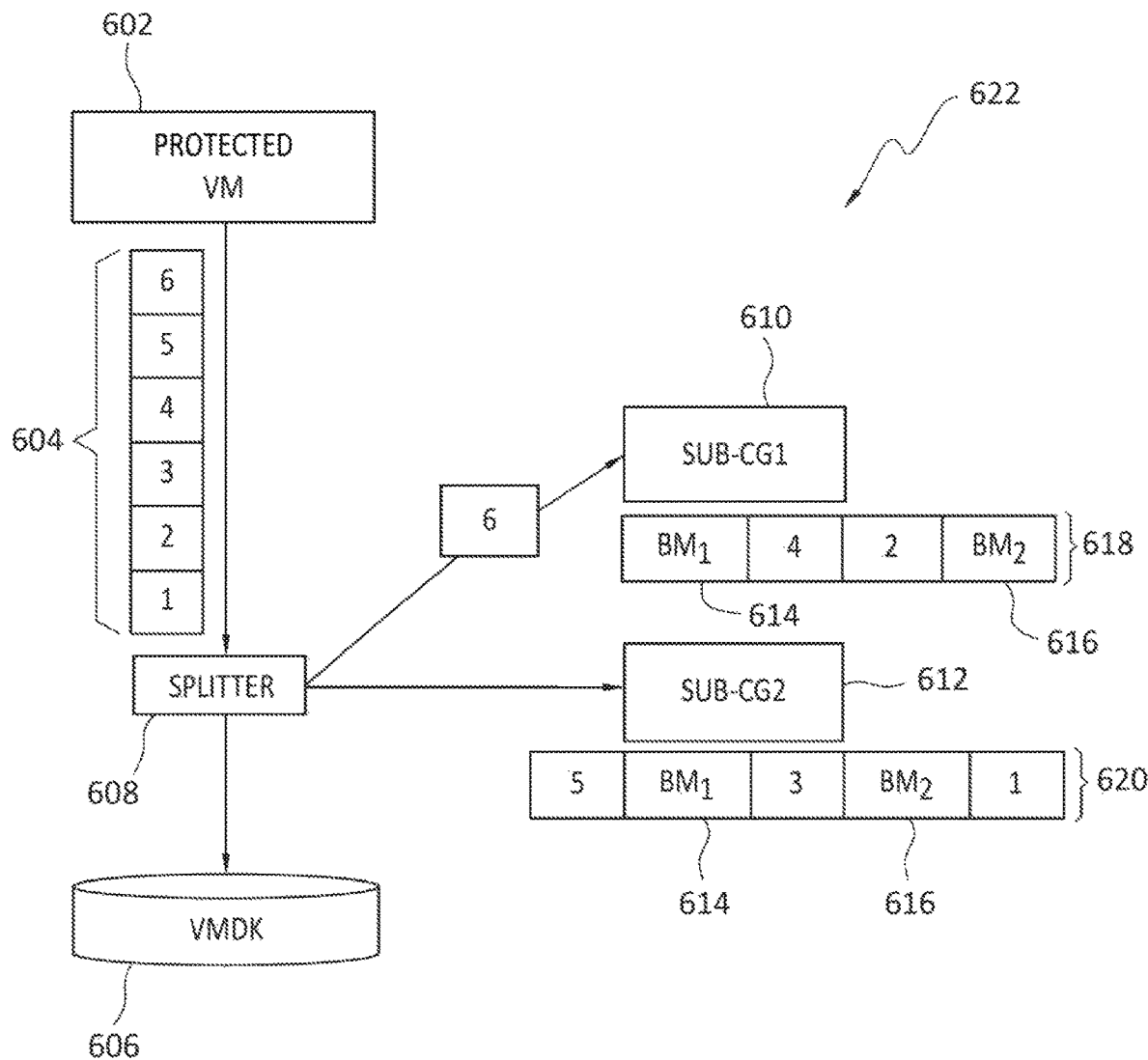
FIG. 6 discloses an arrangement in which multiple bookmarks are inserted in one or more stream journals.

With attention now to FIGS. 5 and 6, further details are provided concerning establishing and maintaining bookmark consistency in a distributed CG. In general, FIG. 5 discloses circumstances in which inconsistent bookmarking could occur in a distributed CG, while FIG. 6 is concerned with approaches for establishing and maintaining bookmark consistency in a distributed CG. Note that as used herein, 'consistency' or 'bookmark consistency' refers to write order fidelity. That is, bookmarks are considered to be consistent with each other when they are placed in such a way that, considered from the perspective of a distributed CG as a whole, the order of writes and bookmarks in a group of grid-CG journal streams, accurately reflects the order in which the writes were issued, for example, by an application of a VM.

In the example of FIG. 5, a protected VM 502 may issue IOs 504 that may intended for a volume 506, such as a VMDK. The IOs 504 may be intercepted by a splitter 508 and distributed amongst one or more grid-CGs 510 and 512 (labeled 'sub-CGx' in FIG. 5), for example. As shown, the example grid-CGs 510 and 512 may insert one or more bookmarks 514 and 516 at various points in their respective journal streams 518 and 520.

However, because each grid-CG 510 and 512 is working independently, relative to the other, a given grid-CG may only generate bookmarks that are consistent at the level of the grid-CG, that is, within its own journal stream. Those bookmarks may, or may not, be consistent at the CG level, that is, at the level of the distributed CG. These points are illustrated in the example of FIG. 5, in which a distributed CG 522 comprises the grid-CG 510 and grid-CG 512.

A sequence of IOs, such as writes 1, 2, 3, 4, 5, 6, arrive at the splitter 508. That is, write 1 arrives to offset 1, write 2 arrives to offset 2, and so forth. In the illustrated example, the distributed CG 522 includes two grids, so that writes with even offset/order are sent by the splitter 508 to grid-CG1 510 and writes with odd offset/order are sent by the splitter 508 to grid-CG2 512. Particularly, the splitter 508 sends writes 2, 4, 6 to grid-CG1 510, and writes 1, 3, 5 to grid-CG2 512. For the sake of illustration, it is assumed that the communication connection between the splitter 508 and grid-CG1 510 is faster than the communication connection between the splitter 508 and grid-CG2 512. As such, write 4 may arrive at grid-CG1 510 before write 3 arrives at grid-CG2 512, even if write 3 was sent by the splitter 508 before write 4 was sent. Thus, grid-CG1 510 writes the bookmark BM1 514 after write 4, and grid-CG2 512 write the bookmark BM2 516 after write 1. As explained below however, both bookmarks BM1 514 and BM2 516 are inconsistent. That is, when considered from the overall perspective of the distributed CG 522, the fidelity of the write order of the IOs 504 has not been maintained at the distributed CG 522.

In particular, bookmark BM1 514 was placed by grid-CG1 510 after write 4. Thus, in order for bookmark BM1 514 to be consistent, taking into account the writes directed to grid-CG2 512, a bookmark would have to have been placed by grid-CG2 512 after write 3 but before write 5, as shown in FIG. 6. As shown in FIG. 5 however, bookmark BM2 516 was instead placed prior to write 3. Thus, the placement of bookmark BM1 514 is inconsistent with the location of bookmark BM2 516.

Similarly, the placement of bookmark BM2 516 is inconsistent with the location of bookmark BM1 514. In particular, and with continued reference to FIG. 5, the bookmark BM2 516 was placed by grid-CG2 512 after write 1, and thus could have been consistent with bookmark BM1 514 only if grid-CG1 510 had placed bookmark BM1 514 in the journal stream 514 before write 2, as shown in FIG. 6. Note that consistency, that is, write order fidelity, would have been maintained, as well, if bookmark BM1 514 had alternatively been placed in the journal stream 518 between write 2 and write 4 since, in that location, bookmark BM1 514 would still precede write 3, as it does in journal stream 512.

Thus, FIG. 5 demonstrates an example of how write order fidelity could be compromised if bookmark placement is considered only from a 'local' grid-CG perspective, rather than from the 'global' perspective of the distributed CG as a whole. FIG. 6, discussed below, discloses one example of an approach for avoiding inconsistency in a distributed CG.

In general, FIG. 6 involves an approach that may achieve consistency at the distributed CG level through the use of a counter to mark the writes in the splitter. The counter, which may, or may not, be included as an element of the splitter, may be referred as the "splitter-counter" and it may be incremented for every write that arrives at the splitter. The splitter-counter may enable the grid-CG to place the bookmark in journal stream in a way that will ensure consistency at the distributed CG level.

As shown in FIG. 6, a protected VM 602 may issue IOs 604 that may intended for a volume 606, such as a VMDK. The IOs 604 may be intercepted by a splitter 608 and distributed amongst one or more grid-CGs 610 and 612 (labeled 'sub-CGx' in FIG. 6), for example. As shown, the example grid-CGs 610 and 612 may insert one or more bookmarks 614 and 616 at various points in their respective journal streams 618 and 620.

Operationally, a grid-CG, such as the grid-CG1 610, may, at some arbitrary time, decide to take a bookmark, such as bookmark BM1 614 for example. That grid-CG may place the bookmark at the end of its journal stream, such as one of the journal streams 616 or 618 for example, that is, the most recent point in the journal stream. The grid-CG that placed the bookmark may then broadcast the most recent splitter-counter value to the other grid-CG(s).

The other grid-CGs, such as grid-CG2 612, that receive the broadcast of the splitter-counter value may then place the bookmark BM1 614 in their journal stream, such as journal stream 620 for example. In particular, the other grid-CGs may place the bookmark in their journal stream before, that is, ahead of, the first write that has a splitter-counter value that is larger than the broadcast splitter-counter value. In the event that a larger splitter-counter value cannot be found by the sub-CG that received the broadcast, the bookmark may remain in a pending state at the other grid-CG until a write with the larger splitter-counter value arrives at that sub-CG.

For example, and as shown in FIG. 6, grid-CG2 612 has placed bookmark BM2 616 after write 1, and has broadcast splitter-counter value '1' to grid-CG1 610. In response, grid-CG1 610 has placed BM2 before write 2. Thus, bookmark BM2 616 is consistent across the distributed CG 622 as a whole because it appears after write 1 in stream journal 620, and before write 2 in stream journal 618. Next, grid-CG1 610 has placed bookmark BM1 after write 4, and then broadcast splitter-counter value '4' to grid-CG2 612. In response, grid-CG2 waits for write 5 to arrive, and then places bookmark BM1 614 ahead of write 5. Thus, bookmark BM1 614 is consistent across the distributed CG 622 as a whole because it appears after write 4 in stream journal 618, and before write 5 in stream journal 620. Note that bookmark 'BM2' is so designated because it is initiated by grid-CG1 610 and, correspondingly, bookmark 'BM2' is so designated because it is initiated by grid-CG2 612. In the illustrated example, only 2 bookmarks are used, in the interest of simplicity. In practice, any number of bookmarks may be employed.

In the example of FIG. 6, even-numbered writes are directed by the splitter 608 to grid-CG1 610, while odd-numbered writes are directed by the splitter 608 to grid-CG2 612. This even/odd write scheme is presented only by way of example and is not intended to limit the scope of the invention in any way. Other write schemes may alternatively be employed.

For example, writes may be divided amongst grid-CG2 according to the timeframe when they occur, so that all writes in a first IO second timeframe are directed to one of the grid-CGs, while all writes in the next IO seconds are directed to another grid-CG. More generally, writes may be distributed amongst one or more grid-CGs in any manner that may preserve the desired granularity needed for a restore process. Moreover, the size of a write, or writes, may be selected as needed. For example, a write may be a single block, or a group of 'n' blocks such as 4 blocks. No particular write size is required.

Figure 7:
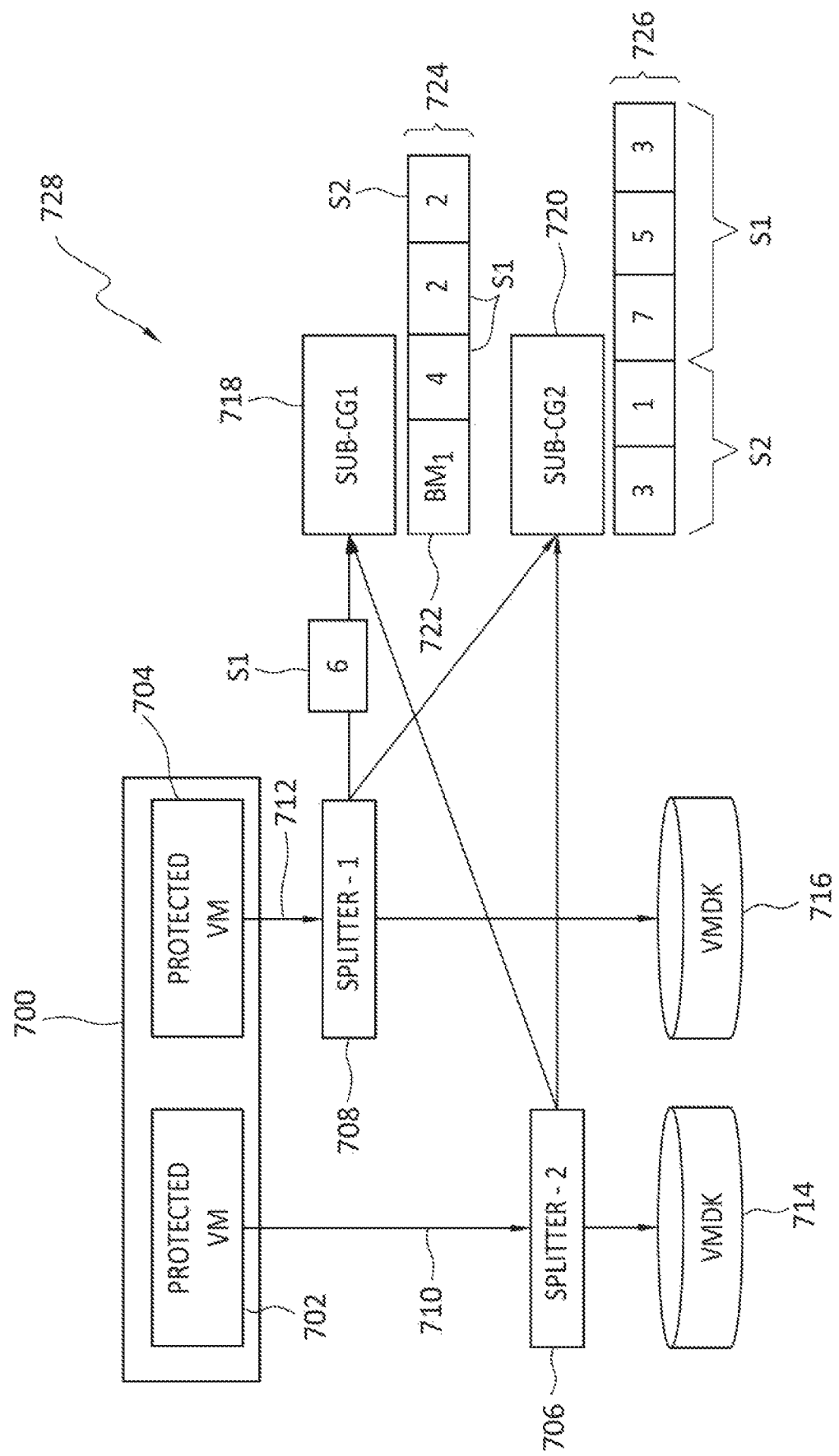
FIG. 7 discloses a multiple splitter configuration.

Turning next to FIG. 7, a configuration is disclosed that includes multiple splitters. As shown in FIG. 7, a consistency group 700 may comprise multiple protected VMs, such as VMs 702 and 704, that are hosted by different respective splitters, such as splitters 706 and 708. In more detail, the protected VMs 702 and 704 may each issue IOs 710 and 712 that may be intended for a respective volume 714 and 716, such as VMDKs for example. The IOs 710 and 712 may be intercepted by the splitters 706 and 708 and distributed amongst one or more grid-CGs 718 and 720 (labeled 'sub-CGx' in FIG. 7), for example. As shown, the example grid-CGs 718 and 720 may insert one or more bookmarks 722 at various points in their respective journal streams 724 and 726.

As further indicated in FIG. 7, writes are being distributed by the two splitters 706 and 708. Writes from the splitter 708 are denoted 'S1' (writes 2 and 4 in the journal stream 724, pending write 6, and writes 7, 5, 3 in the journal stream 726), and writes from the splitter 706 are denoted 'S2' (write 2 in the journal stream 724, and writes 1 and 3 in the journal stream 726). Each of the splitters 708 and 706 may mark its writes with its own splitter-counter. In the illustrated example, write S2 (2) arrives at the grid-CG1 718 before writes S1 (2,4) arrive at grid-CG1 718. As well, writes S1 (3,5,7) arrive at grid-CG2 720 before writes S2 (1,3) arrive at grid-CG2 720. As further indicated, grid-CG1 718 has placed bookmark BM1 722 in the journal stream 724, and broadcast splitter counter value of 4 for S1 and splitter counter value of 2 for S2.

That is, writes 2 and 4 from splitter 708 have been added to the journal stream 724, and write 6 from splitter 708 is pending, for a total of 3 writes from the splitter 708. Thus, the next write from the splitter 708 would be the fourth write, hence the splitter counter value is 4 for S1. Similarly, write 2 from splitter 706 to grid-CG1 718 has been written to the journal stream 724. Thus, the next write from the splitter 706 would be the second write, hence the splitter counter value is 2 for S2.

Note that while bookmark BM1 722 has been placed in the stream journal 724 after write S1 (4) and before write S1 (6), it cannot be placed in the stream journal 726 in such a way as to be consistent when the distributed CG 728 is considered as a whole. For example, if bookmark BM1 722 were placed between writes S1 (5,3), the bookmark would be consistent as to the writes S1 of stream journals 724/726, but inconsistent with regard to the distributed CG 728 as a whole since it would appear in the stream journal 726 before write S2 (1) while appearing after write S2 (2) in the stream journal 724. Other attempted placements of bookmark BM1 722 may also be problematic. For example, if bookmark BM1 722 were placed between S2 writes (3,1), the bookmark BM1 722 would be consistent as to the S2 writes, but inconsistent with regard to the distributed CG 728 as a whole because it would appear after write S1 (7) in stream journal 726, but before write S1 (6) in stream journal 724.

With continued reference to the example of FIG. 7, one approach to resolving the inconsistent bookmark problem that may arise with multiple splitters writing IOs may involve rearranging writes in a stream journal to create a consistent bookmark. Particularly, the other grid-CGs may rearrange the writes in their respective stream journals in order to be able to create consistent bookmark. The writes in the stream journal(s) may be rearranged as long as the splitter-counter order is maintained for each splitter independently. Thus, in the example of FIG. 7, grid-CG2 720 may move, in the stream journal 726, write S2 (1) between write S1 (3) and write S1 (5). This will enable placement of bookmark BM1 722 after S2 (1). Thus, the modified stream journal 726 would include (from newest to oldest) write S2 (3), writes 51 (7,5), bookmark BM1 722, write S2 (1), and write S1 (3). Although the stream journal 726 has been modified, the write counts for S1 and S2 have not changed in this example and, thus there may be no need for grid-CG2 720 to broadcast the changed write order of the stream journal 726 to the grid-CG1 724.

In general, as long as the writes preceding a bookmark are correct and complete, the specific order of those writes may not matter. This can be seen in FIG. 7 where the write order of the stream journal 726 has been modified, but the bookmark BM1 722 positions in both stream journals 724 and 726 are consistent.

As thus exemplified in FIGS. 6 and 7, consistency may be achieved in various ways, including by placement of the bookmark in a consistent position, if one exists, and/or, by rearranging the order of writes in one or more journals. It is noted that, in some circumstances at least, journal rearrangement may not be a trivial action since the journal stream may be a persistent data-structure that was designed to efficiently add/remove elements from the head or the tail. However, there are two junction points in some example journal life cycles that may enable efficient implementation of the rearrangement.

Particularly, a first point may be in the stream cache, before writes are flushed persistently. That is, since the rearrangement may be between writes that arrived in the last few milliseconds, it may be reasonable to assume that a cache size, of 50 MB for example, may suffice to ensure that most rearrangement can be done in cache. A second point may be during distribution of the journal, when writes are moved from 'do' to 'undo' streams. At that point, writes may be uploaded to memory and thus it may be possible to make the rearrangement before cache is flushed again. The end result may be that the rearranging does not require costly operations on the journal. Embodiments of the invention may take advantage of the locality of the rearrangements, to implement the rearrangements when data is in transition, thus achieving the rearrangement with little to no impact on performance.

As disclosed herein, embodiments of the invention may comprise the use of distributed CG at the splitter in RP4VMs in order protect applications with high-performance requirements that exceed the performance of a single DPA. The CG may be divided into grid-CGs that may be able to communicate with each other in order to efficiently create a bookmark that is consistent across the distributed CG.

D. Example Methods

Figure 8:
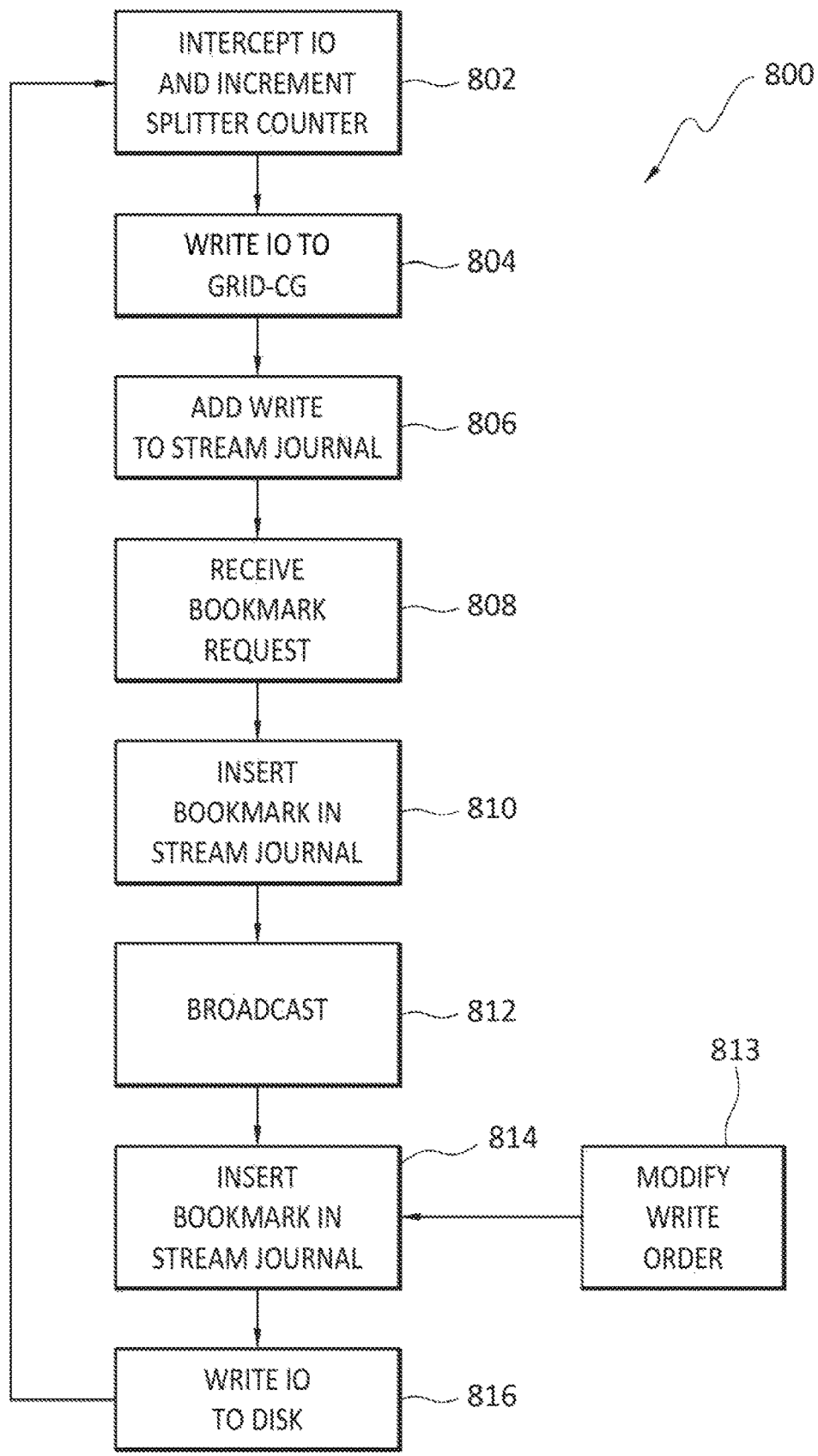
FIG. 8 discloses an example method.

Attention is directed now to FIG. 8, where methods are disclosed for IO distribution by one or more splitters, where one example method is denoted generally at 800. It is noted with respect to the example method of FIG. 8, as well as to any of the other disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

The example method 800 may be performed in whole or in part by a single party, or cooperatively by multiple parties. In some embodiments, part or all of the method 800 may be cooperatively performed by one or more splitters and one or more DPAs. However, the scope of the invention is not limited to performance of the method 800, or any portion thereof, by any particular entity or entities.

The example method 800 may begin when an IO issued by an application, such as an application of a VM for example, is intercepted by a splitter, and a splitter counter value incremented 802. Particularly, the splitter counter value may be incremented to reflect the write that was intercepted.

The splitter may then direct the IO to a grid-CG 804 that is one of a plurality of grid-CGs that collectively define a distributed CG. Each of the grid-CGs may be associated with a respective stream journal. Depending upon the embodiment, one or more splitters may write IOs to one or more grid-CGs. Each grid-CG may comprise, or consist of, a respective DPA, although no particular implementation of a grid-CG is required.

After receipt of the IO, the grid-CG may write the IO to its stream journal 806. At some point after one or more IOs have been written 806 to the stream journal, the grid-CG may receive 808 a request to insert a bookmark in the stream journal. In some embodiments, the grid-CG may not write the bookmark to the stream journal until after the next IO is received from the splitter. At some point after receipt of the request 808, the grid-CG may then insert 810 the bookmark in the stream journal of the grid-CG. The bookmark request 808 may be received, for example, from a data protection server, such as a backup and/or restore server for example, or other entity.

The grid-CG may then broadcast a splitter counter value 812, which may be obtained from the splitter in some embodiments, to the other grid-CG(s) of the distributed CG. After the broadcast 812, the bookmark may be inserted 814 in the respective stream journal(s) by the other grid-CG(s). In some embodiments, the order of the writes in one or more stream journals may be modified 813 prior to insertion 814 of the bookmark. Finally, the intercepted IO may be written 816 to disk. In general, the IO may be written 816 to disk at any time after the grid-CG has transmitted an acknowledgment of receipt of the IO from the splitter. Thus, for example, the IO may be written to disk between 806 and 808, or between 804 and 806. As shown in the example of FIG. 8, the method 800 may be performed recursively for two or more IOs.

E. Further Example Embodiments

Following are some further example embodiments of the invention. These are presented only by way of example and are not intended to limit the scope of the invention in any way.

Embodiment 1

A method, comprising: A method, comprising: intercepting an IO that is directed to a volume; writing the IO to a grid-CG that is one of a plurality of grid-CGs that collectively form a distributed CG; adding the IO to a stream journal associated with the grid-CG; receiving a bookmark request; in response to the bookmark request, inserting a bookmark in the stream journal; incrementing a splitter counter and broadcasting a splitter counter value to the grid-CGs in the distributed CG; and inserting the bookmark in respective stream journals of the grid-CGs in the distributed CG.

Embodiment 2

The method as recited in embodiment 1, wherein the IO is intercepted by a splitter, and written to the grid-CG by the splitter.

Embodiment 3

The method as recited in any of embodiments 1-2, wherein the IO is issued by an application at a VM.

Embodiment 4

The method as recited in any of embodiments 1-3, wherein the bookmark is inserted in the stream journals such that write order fidelity is maintained across the distributed CG.

Embodiment 5

The method as recited in any of embodiments 1-4, wherein the IO is one of a plurality of IOs received by a splitter and distributed by the splitter amongst the grid-CGs.

Embodiment 6

The method as recited in any of embodiments 1-5, wherein the bookmark cannot be inserted in the stream journals in such a way as to maintain write order fidelity, and the method further comprises rearranging one or more writes in one or more stream journals and then inserting the bookmark in the stream journals such that write order fidelity is maintained across the distributed CG.

Embodiment 7

The method as recited in any of embodiments 1, 3-4 and 6, wherein the IO is one of a plurality of IOs received by a group of splitters, and the group of splitters distributes the plurality of IOs among the grid-CGs such that write order fidelity is maintained across the distributed CG.

Embodiment 8

The method as recited in any of embodiments 1-7, further comprising writing the IO to the volume after the IO is acknowledged by the grid-CG to a splitter.

Embodiment 9

The method as recited in any of embodiments 1-8, wherein one or more of the grid-CGs comprises a respective DPA.

Embodiment 10

The method as recited in any of embodiments 1-9, wherein the grid-CGs use the splitter counter value to determine where, in their respective stream journals, the bookmark should be inserted.

Embodiment 11

A method for performing any of the operations, methods, or processes, or any portion of any of these, disclosed herein.

Embodiment 12

A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
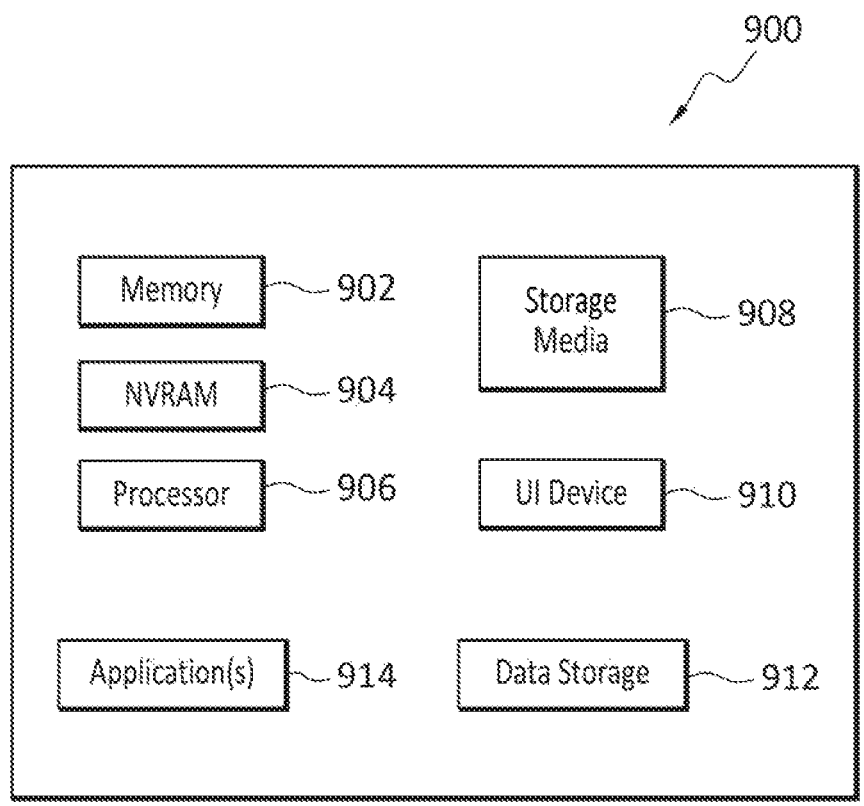
FIG. 9 discloses aspects of an example computing entity.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile random access memory (NVRAM) 904, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising: intercepting an input/output operation (IO) that is directed to a volume;
    writing the IO to a grid-consistency group (grid-CG) of a plurality of grid-CGs that collectively form a distributed CG;
    adding the IO to a stream journal of the grid-CG of the plurality of CG grid-CGs;
    receiving a bookmark request;
    in response to the bookmark request, generating a bookmark and inserting the bookmark in the stream journal;
    incrementing a splitter counter value and broadcasting the incremented splitter counter value to grid-CGs in the distributed CG other than the grid-CG;
    inserting the bookmark in respective stream journals of the grid-CGs in the distributed CG other than the grid-CG; and in a case where the bookmark cannot be inserted in the respective stream journals to maintain write order fidelity, rearranging one or more writes in one or more stream journals and then inserting the bookmark in the one or more stream journals such that the write order fidelity is maintained across the distributed CG.

2. The method as recited in claim 1, wherein the IO is intercepted by a splitter, and written to the grid-CG by the splitter.

3. The method as recited in claim 1, wherein the IO is issued by an application at a VM.

4. The method as recited in claim 1, wherein the bookmark is inserted in the respective stream journals such that write order fidelity is maintained across the distributed CG.

5. The method as recited in claim 1, wherein the IO is one of a plurality of Ios received by a splitter and distributed by the splitter amongst the plurality of grid-CGs.

6. The method as recited in claim 1, wherein the IO is one of a plurality of Ios received by a group of splitters, and the group of splitters distributes the plurality of Ios among the plurality of grid-CGs such that write order fidelity is maintained across the distributed CG.

7. The method as recited in claim 1, further comprising writing the IO to the volume after the IO is acknowledged by the grid-CG.

8. The method as recited in claim 1, wherein one or more of the grid-CGs comprises a data protection appliance (DPA).

9. The method as recited in claim 1, wherein the plurality of grid-CGs use the splitter counter value to determine where, in their respective stream journals, the bookmark should be inserted.

10. A non-transitory storage medium having stored therein instructions that are executable by one or more hardware processors to perform operations comprising:
   intercepting an input/output operation (IO) that is directed to a volume;
   writing the IO to a grid-consistency group (grid-CG) a plurality of grid-CGs that collectively form a distributed CG;
   adding the IO to a stream journal of the grid-CG of the plurality of Cg grid-CGs;
   receiving a bookmark request;
   in response to the bookmark request, generating a bookmark and inserting the bookmark in the stream journal;
   incrementing a splitter counter value and broadcasting the incremented splitter counter value to the plurality of grid-CGs in the distributed CG other than the grid-CG;
   inserting the bookmark in respective stream journals of grid-CGs in the distributed CG other than the grid-CG; and
   in a case where the bookmark cannot be inserted in the respective stream journals to maintain write order fidelity, rearranging one or more writes in one or more stream journals and then inserting the bookmark in the one or more stream journals such that the write order fidelity is maintained across the distributed CG.

11. The non-transitory storage medium as recited in claim 10, wherein the IO is intercepted by a splitter, and written to the grid-CG by the splitter.

12. The non-transitory storage medium as recited in claim 10, wherein the IO is issued by an application at a VM.

13. The non-transitory storage medium as recited in claim 10, wherein the bookmark is inserted in the respective stream journals such that write order fidelity is maintained across the distributed CG.

14. The non-transitory storage medium as recited in claim 10, wherein the IO is one of a plurality of Ios received by a splitter and distributed by the splitter amongst the plurality of grid-CGs.

15. The non-transitory storage medium as recited in claim 10, wherein the IO is one of a plurality of IOs received by a group of splitters, and the group of splitters distributes the plurality of IOs among the plurality of grid-CGs such that write order fidelity is maintained across the distributed CG.

16. The non-transitory storage medium as recited in claim 10, wherein the operations further comprise writing the IO to the volume after the IO is acknowledged by the grid-CG.

17. The non-transitory storage medium as recited in claim 10, wherein one or more of the grid-CGs comprises a data protection appliance (DPA).

18. The non-transitory storage medium as recited in claim 10, wherein the plurality of grid-CGs use the incremented splitter counter value to determine where, in their respective stream journals, the bookmark should be inserted.

* * * * *